No. 704,910. Patented July 15, 1902.
P. OLAFFSEN.
RAT TRAP.
(Application filed Mar. 7, 1902.)
(No Model.) 2 Sheets—Sheet 1.

Witnesses
Harry L. Ames.
Chas. S. Hyer.

Inventor
Peter Olaffsen,
By Victor J. Evans
Attorney

THE NORRIS PETERS CO., PHOTO-LITHO., WASHINGTON, D. C.

No. 704,910. Patented July 15, 1902.
P. OLAFFSEN.
RAT TRAP.
(Application filed Mar. 7, 1902.)
(No Model.) 2 Sheets—Sheet 2.

Witnesses
Harry L. Ames.
Chas. S. Hyer.

Inventor
Peter Olaffsen
By Victor J. Evans
Attorney

UNITED STATES PATENT OFFICE.

PETER OLAFFSEN, OF TACOMA, WASHINGTON.

RAT-TRAP.

SPECIFICATION forming part of Letters Patent No. 704,910, dated July 15, 1902.

Application filed March 7, 1902. Serial No. 97,101. (No model.)

*To all whom it may concern:*

Be it known that I, PETER OLAFFSEN, a citizen of the United States, residing at Tacoma, in the county of Pierce and State of Washington, have invented new and useful Improvements in Rat-Traps, of which the following is a specification.

This invention relates to traps for rats, mice, and other small animals or rodents; and the object of the same is to provide a sensitively-operating and effective trap which will insure the retention and destruction of the animal caught thereby and one wherein the parts are so arranged that the animal will have to fully enter the trap to reach the bait-support.

The invention consists in the construction and arrangement of the several parts, which will be more fully hereinafter described and claimed.

Figure 1:
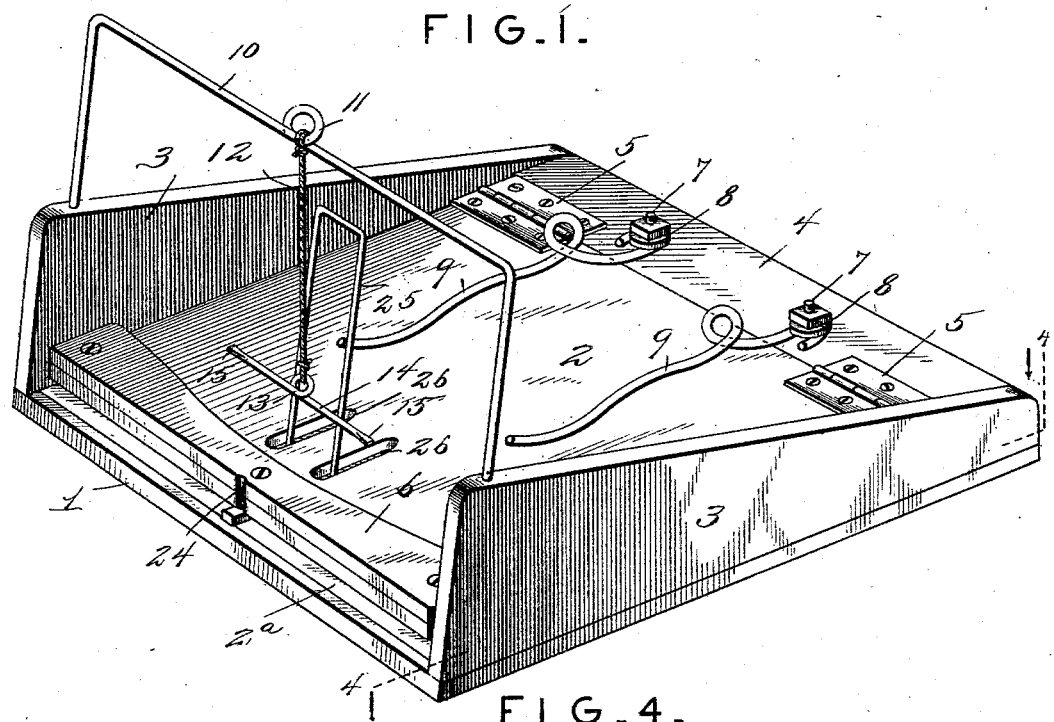
Figure 4:
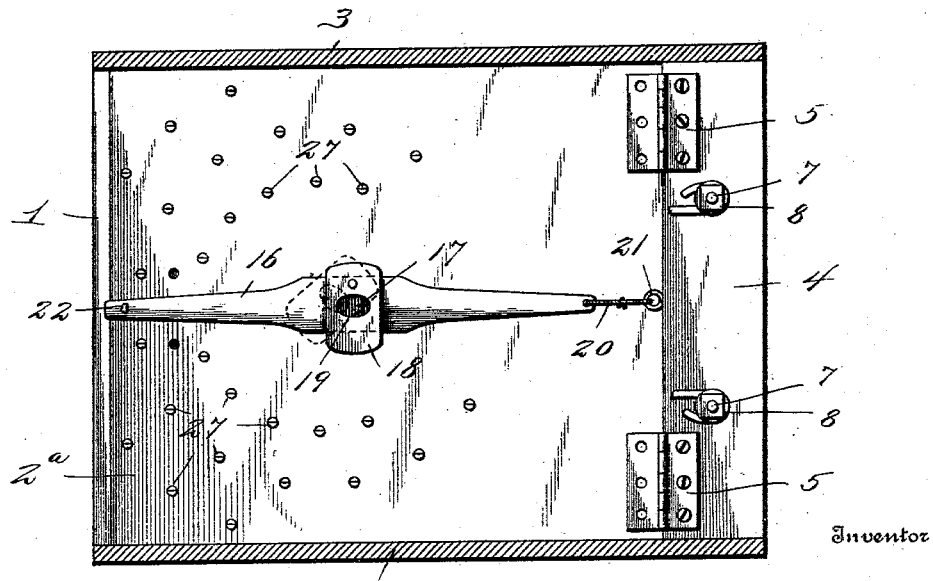
Figure 2:
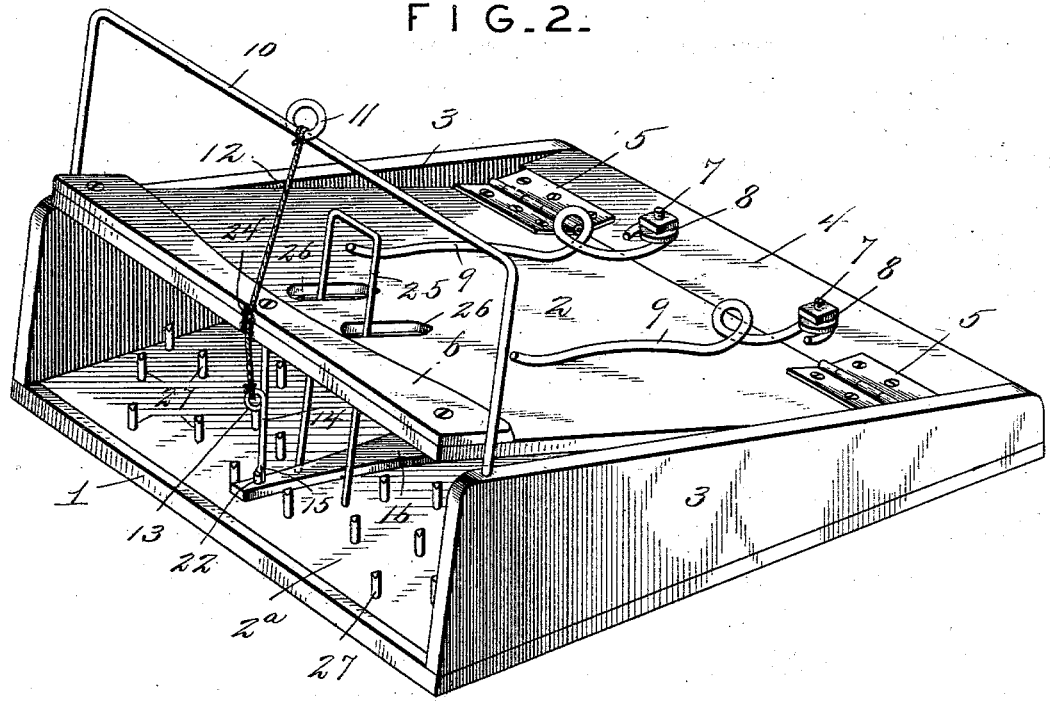
Figure 3:
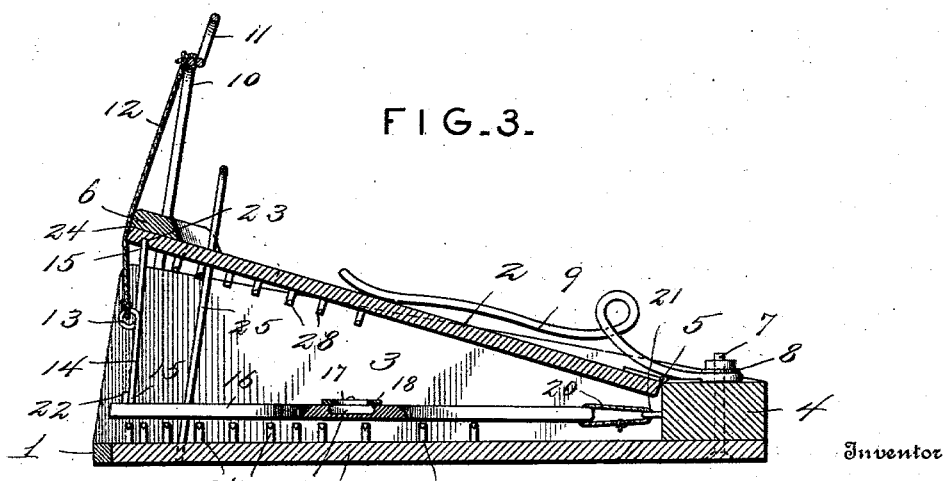

In the drawings, Figure 1 is a perspective view of the trap shown closed. Fig. 2 is a similar view of the trap in set condition. Fig. 3 is a longitudinal vertical section of the trap as shown by Fig. 2. Fig. 4 is a horizontal section taken in the plane of the line 4 4 of Fig. 1.

Similar numerals of reference are employed to indicate corresponding parts in the several views.

The trap comprises two essential elements, consisting of a body or main frame 1 and a trap lid or cover 2, movably secured to said body. The body or frame 1 comprises a base 2ª, with opposite sides 3, inclined downwardly at their upper edges toward the rear end of the trap, and between the rear ends of the sides 3 a transverse back strip 4 is firmly secured to the base 2ª. This back strip 4 has considerable width and thickness to render it strong and durable enough to resist the strain brought to bear thereon. The trap lid or cover 2 has its rear edge movably connected to the upper front portion of the strip 4 by hinges 5, and at the front edge said lid or cover is provided with a transversely-extending reinforce-strip 6. The upper end of suitable screw bolts or pins 7 project above the upper plane of the strip 4, and connected thereto by nuts and washers 8 are the rear ends of springs 9, which continuously bear upon the upper surface of the trap lid or cover 2 and operate to hold the latter in a downwardly-inclined position, as shown by Fig. 1. An upstanding bail 10 is rigidly secured to the front ends of the sides 3 and has a central eye 11, to which one end of a cord or similar flexible device 12 is secured. The opposite end of said cord or flexible device 12 is attached to an eye 13 at the center of a trip-rod 14, having the opposite ends flattened, as at 15. This trip-rod coöperates with a bait-holder, consisting of an elongated arm 16, enlarged at the center and formed with a bait-receiving pocket 17, adapted to be covered by a pivoted slide 18, with an aperture 19 therethrough to expose the bait in the said pocket. The arm 16 is movably attached at its rear end by a cord, chain, or like device 20 to an eye 21, secured in the center of the front edge of the strip 4, and the front free end of said arm has a vertical stop projection 22, with a rear flattened portion adapted to be engaged by either one of the flattened terminals of the trip-rod 14, as clearly shown by Figs. 2 and 3. When the trip-rod 14 is disposed in operative engagement with the bait-holder, it is arranged vertically and has its upper end inserted in a socket 23 in the under side of the front portion of the trap lid or cover 2, and the cord or like device 12, attached to the rod, is disposed in a recess 24 in the center of the front edges of the trap lid or cover 2 and the reinforce-strip 6. When the trip-rod is placed in engagement with the bait-holding device, the latter is held elevated in view of the forward tension exerted thereon by the said trip-rod through the medium of the cord or other flexible device 12, the latter being of such length as to pull forwardly or outwardly on the trip-rod. To keep the bait-holding device in central position in relation to the base 2ª, an upstanding centering-loop 25 is employed, having its terminals secured in said base and the legs extending through slots 26 in the trap lid or cover 2. It is obvious that by means of the bait-receiving pocket 17 and closing-slide therefor bait may be economically used and also be prevented from being pulled out into the body of the trap.

On the base 2ª, on opposite sides of the bait-supporting device, are upstanding sharpened pins or impaling-spurs 27, and above the said bait-holding device and carried by the trap lid or cover 2 are similar sharpened spurs or impaling devices 28.

When the trap is set, as shown by Figs. 2 and 3, an enlarged entrance-opening is produced in view of the interposition of the trip-rod 14, and from the said opening the open space within the trap gradually decreases toward the strip 4, owing to the upward inclination of the trap lid or cover 2. This entices the animal to enter the trap with less trepidation and permits its body to be fully located therein, particularly in view of the position of the bait at the center of the bait-holding device. As soon as the animal nibbles the bait in the pocket 17 and exposed through the opening 19 in the slide 18 the arm 16 is released from the trip-rod 14 and the springs 9 throw down the trap lid or cover 2, thus driving the spurs 27 and 28 into the body of the entrapped animal and firmly holding him against escape as well as insuring his destruction.

The improved trap may be made in different proportions or dimensions to suit animals of different sizes, and while the preferred form of the same has been shown and described it is obvious that changes in the minor details of construction may be resorted to without in the least departing from the principle of the invention.

Having thus fully described the invention, what is claimed as new is—

1. In a trap of the class set forth, the combination of a body with closed sides and rear end, the sides being highest at the front, a spring-actuated trap-cover movably attached at its rear end to a portion of the main body of the trap, the bottom of the body and lower side of the cover having impaling-spurs projecting therefrom, a loosely-mounted bait-holding device, and a trip-rod to engage the bait-holding device and cover to set the trap.

2. In a trap of the class set forth, the combination of a body, a trap-cover coöperating therewith, a bait-holding device loosely connected at its rear end solely, and having a bait-holding pocket with a slide, and a projection at its free end, a rigid bail rising from the body above the trap-cover, and a trip-rod flexibly suspended from the bail and adapted to engage the cover and bait-holding device.

3. In a trap of the class set forth, the combination of a body, a trap-cover movably attached thereto, a bait-holding device extending longitudinally through the central portion of the body above the bottom of the latter, a centering loop for maintaining the bait-holding device in proper position, and a flexibly-suspended trip-rod adapted to engage the bait-holding device and trap-cover.

4. A holding device for a trap consisting of an elongated arm flexibly connected at its rear end and having a central enlargement with a pocket therein, and a slide to close the pocket and having an opening therethrough.

5. In a trap of the class set forth, the combination of a body having a spring-actuated trap-cover attached thereto and adapted to normally close downwardly thereover, a bait-holding device, and a flexibly-suspended trip-rod for interposition between the front end of the bait-holding device and the lid or cover.

In testimony whereof I affix my signature in presence of two witnesses.

PETER OLAFFSEN.

Witnesses:
H. P. HANSEN,
K. O. LIVEDALEN.